United States Patent Office 2,833,500
Patented May 6, 1958

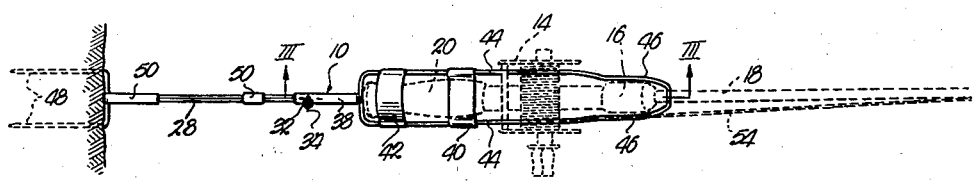
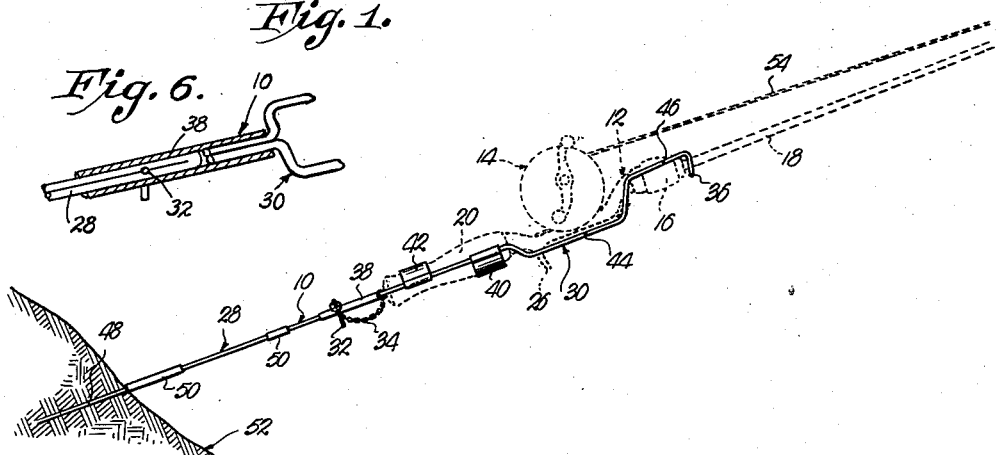
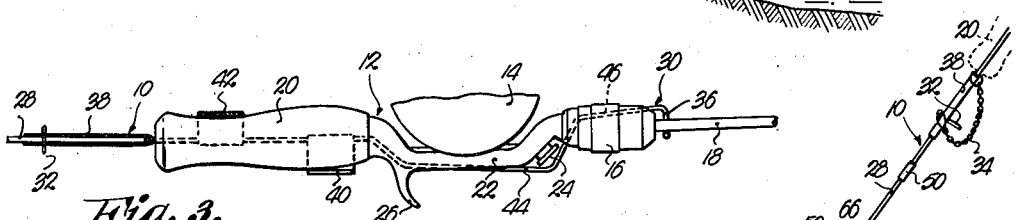
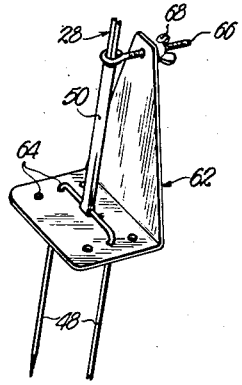
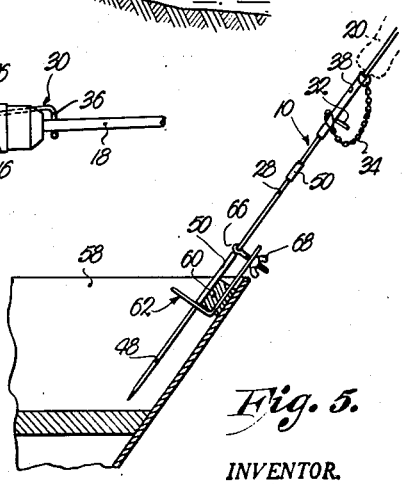
INVENTOR.
Thomas B. Jones

2,833,500
COLLAPSIBLE, PORTABLE FISHING ROD SUPPORT

Thomas B. Jones, Rich Hill, Mo.

Application August 10, 1953, Serial No. 373,097

1 Claim. (Cl. 248—42)

This invention relates to fishing tackle and particularly to a support adapted to receive tackle which includes a reel mount on one end of the rod, the support being adapted for piercing into the ground or attachment to a boat and being so formed as to clear the reel for free operation thereof without interference by the support.

Another object of this invention is to provide a support for fishing rods having a cradle on one end thereof to support the rod itself, a second cradle intermediate the ends thereof to support the handle of the reel mount and a retainer that normally overlies the handle to cooperate with the cradles in positively preventing dislodgment of the fishing tackle from the support.

Other objects include the way in which the support is made essentially from wire and includes means not only for clearing the reel but for clearing the chuck on the reel mount that receives the rod; the way in which ground-piercing elements are provided on one end of the support remote from the outermost cradle; the manner of making the support collapsible and therefore, fully portable; and the way in which bracket means is provided cooperable with the piercing elements to adapt the support for mounting on the rail of a boat.

In the drawing:

Figure 1 is a top plan view of a collapsible, portable fishing rod support made pursuant to the present invention showing fishing tackle in the nature of a rod and reel mounted thereon.

Fig. 2 is a side elevational view thereof.

Fig. 3 is an enlarged, fragmentary, side elevational view.

Fig. 4 is a perspective view illustrating the bracket for mounting the support on a boat.

Fig. 5 is a fragmentary, sectional view through a boat showing the manner of attachment of the support to the rail of the boat; and Fig. 6 is a fragmentary, perspective view showing the way in which the two sections of the support are releasably interconnected, the sleeve employed for such purpose being in section.

The support forming the subject matter of this invention is broadly designated by the numeral 10, and is adapted to receive a mount 12 for a reel 14 that is also equipped with a chuck 16 to releasably receive a rod 18. A handle 20 is provided on the mount 12 at that end thereof opposite to the chuck 16.

The mount 12 has a downwardly offset plate 22 that releasably supports the reel 14 through the medium of a locking pin 24. Mounts of this type are also quite conventionally provided with a finger-receiving prong 26 to aid in the manipulation of the tackle while gripping the handle 20.

The support 10 is especially designed to receive fishing tackle of this type in a manner to clear the chuck 16, avoid interference with normal operation of the reel 14, permitting gripping of the handle 20 and use of the prong 26 in the usual manner. To this end the support 10 includes a pair of sections 28 and 30 releasably interconnected through the medium of a pin 32 on a chain 34 that is in turn fastened to the section 30.

Section 30 is made from a continuous length of material presenting a pair of wires spaced to receive the mount 12 therebetween. The bight of the single length of wire is downturned to present a cradle 36 for receiving the rod 18 and the legs thereof are clamped within an elongated, tubular sleeve 38 having a hole therethrough as shown in Fig. 3 for receiving pin 32. The two spaced-apart wires are joined by a strip of sheet material to present a second cradle 40 that receives the handle 20 and are also joined by a similar structure that presents a retainer 42 which overlies the handle 20 adjacent that end of the section 30 opposite to cradle 36.

The two wires are each provided with a downwardly extending, substantially U-shaped portion 44 between the cradles 36 and 40, which portions 44 clear the reel 14. Additionally, the two wires are provided with outwardly-bowed stretches 46 between the portions 44 and the cradle 36, which stretches 46 receive the chuck 16 as best seen in Fig. 1.

The section 28 is likewise composed of a single length of wire rebent and doubled upon itself for extension at its bight into the tubular sleeve 38. A hole through the section 28 adjacent the said bight, registers with the aforementioned hole in sleeve 38 to receive pin 32.

The single length of wire that makes up section 28, has its legs terminating in a pair of spaced, L-shaped ground-piercing elements 48 and a plurality of wrappings 50 on the section 28 hold the two legs thereof together.

The support may be utilized as shown in Figs. 1 and 2 of the drawing for holding the fishing tackle extended outwardly and upwardly from a bank 52 of a stream or lake, and the line 54 of the tackle may hang downwardly from the outermost end of the rod 18 into the water 56 in the usual manner.

If, however, the support is to be used while fishing from a boat 58, support 10 may be mounted on the rail 60 of boat 58 by means of an L-shaped bracket 62 cooperable with the piercing elements 48 of support section 28. Bracket 62 has a plurality of holes 64 in one leg thereof for receiving the prongs 48 and the other leg of bracket 62 receives an eyebolt 66 on the section 28.

In use, the rail 60 is disposed between the upstanding leg of bracket 62 and the section 28 of support 10 is clamped therebetween by means of a wing nut 68 on the eyebolt 66.

Details of construction may be modified within the spirit of this invention and it is, therefore, desired to be limited only by the scope of the appended claims.

Having thus described the invention what is claimed as new and desired to be secured by Letters Patent is:

A support adapted for holding fishing tackle, said tackle including a reel mount having a reel thereon, a handle on one end of the mount, a chuck on the opposite end of said mount, and a rod secured to the chuck, there being a rotatable knob on said reel, said support comprising a pair of sections, one of said sections consisting of a continuous length of wire provided with a downturned, U-shaped rod-receiving bend intermediate its ends and presenting a pair of parallel legs spaced to receive the mount and handle therebetween, the ends of said wire being bent toward each other to form substantially L-shaped elements, each having an inwardly extending portion and an outermost length, said lengths being parallel, and disposed in relatively close, juxtaposed relationship, a tubular member rigidly interconnecting said lengths, whereby said portions prevent displacement of the handle in one direction, an upwardly arched handle retainer joining the legs adjacent said ends for overlying engagement with the handle, and a downwardly arched, handle-receiving cradle joining the legs intermediate said bend and said retainer, said legs being bent downwardly between the cradle and said bend to present a pair of U-shaped portions clearing the reel and the rotatable knob thereon, the other of said sections consisting of a continuous length of wire doubled upon itself to present a bight having a pair of adjacent segments, the ends of said segments being bent to form a pair of parallel, spaced, ground-piercing elements; and means for releasably securing the bight in said member, there being means rigidly interconnecting said segments.

References Cited in the file of this patent

UNITED STATES PATENTS

| | | |
|---|---|---|
| 674,161 | Brown | May 14, 1901 |
| 1,534,642 | Hoagland | Apr. 21, 1925 |
| 1,626,333 | Fain et al. | Apr. 26, 1927 |
| 2,293,305 | Oldham | Aug. 18, 1942 |
| 2,311,823 | Gaskill | Feb. 23, 1943 |
| 2,481,338 | Palmer | Sept. 6, 1949 |
| 2,487,094 | Brown | Nov. 8, 1949 |
| 2,511,160 | Grobowski | June 13, 1950 |

FOREIGN PATENTS

| | | |
|---|---|---|
| 150,071 | Great Britain | Aug. 27, 1920 |
| 409,449 | Great Britain | May 3, 1934 |